United States Patent [19]
Kimura et al.

[11] Patent Number: 5,455,478
[45] Date of Patent: Oct. 3, 1995

[54] VIBRATION WAVE DRIVEN APPARATUS

[75] Inventors: Atsushi Kimura, Yokohama; Hiroyuki Seki, Urawa, both of Japan

[73] Assignee: Canon Kabushiki Kaisha, Tokyo, Japan

[21] Appl. No.: 139,065

[22] Filed: Oct. 21, 1993

Related U.S. Application Data

[63] Continuation of Ser. No. 997,371, Jan. 6, 1992, abandoned, which is a continuation of Ser. No. 700,468, May 15, 1991, abandoned.

[30] Foreign Application Priority Data

May 15, 1990 [JP] Japan ................................. 2-124713

[51] Int. Cl.⁶ .................................................. H01L 41/08
[52] U.S. Cl. .................................................. 310/323
[58] Field of Search ...................................... 310/323, 328

[56] References Cited

U.S. PATENT DOCUMENTS

| | | | |
|---|---|---|---|
| 4,634,915 | 1/1987 | Mukohjima et al. | 310/323 |
| 4,649,311 | 3/1987 | Mukohjima et al. | 310/323 |
| 4,672,256 | 6/1987 | Okuno et al. | 310/323 |
| 4,723,129 | 2/1988 | Endo et al. | 346/1.1 |
| 4,740,796 | 4/1988 | Endo et al. | 346/1.1 |
| 4,771,203 | 9/1988 | Mukohjima et al. | 310/323 |
| 4,978,882 | 12/1990 | Kitani | 310/323 |
| 5,017,823 | 5/1991 | Okumura | 310/323 |
| 5,025,186 | 6/1991 | Tsukada | 310/323 |
| 5,066,884 | 11/1991 | Takagi | 310/323 |
| 5,264,753 | 11/1993 | Mukohjima et al. | 310/323 |

FOREIGN PATENT DOCUMENTS

| | | | |
|---|---|---|---|
| 0416884 | 3/1991 | European Pat. Off. | 310/328 |
| 0135369 | 6/1986 | Japan | 310/323 |
| 62-147974 | 7/1987 | Japan | 310/323 |
| 0190570 | 8/1988 | Japan | 310/323 |

*Primary Examiner*—Mark O. Budd
*Attorney, Agent, or Firm*—Fitzpatrick, Cella, Harper & Scinto

[57] ABSTRACT

A vibration wave driven apparatus wherein a traveling wave generated on the resilient member will move and transport said resilient member on a rail-like stator, characterized in that means for supporting said resilient member is positioned on or about the center of an adjacent antinode and node of each of the standing wave.

32 Claims, 6 Drawing Sheets

VIBRATION WAVE DRIVEN APPARATUS

This is a continuation of application Ser. No. 07/997,371 filed Jan. 6, 1992 now abandoned which is a continuation of Ser. No. 07/700,468 filed May 15, 1991, now abandoned

BACKGROUND OF THE INVENTION

1. Field of the Invention

This invention relates to a vibration wave driven motor, especially to a type of motor in which a resilient member formed with a traveling vibration wave therein is press-contacted to a rail-like stator and the resilient member moves along the side of a rail-like stator or a printer utilizing such kind of vibration wave driven motor.

2. Related Background Art

FIGS. 11 and 12 show examples of a conventional vibration wave driven motor.

1 indicates the resilient member made of metal having a contact surface with projections 1a, which is formed with multiple slits (not indicated in figure). Joined with the resilient member is a piezoelectric element 2 divided into multiple sectors grouped as A and B, whereon several ten KHz alternating current voltage is applied to form a traveling vibration wave. Although detailed explanation of the principle and composition for the piezoelectric element 2 is eliminated here as these belong to the prior arts, the traveling vibration wave is generated by applying alternating current voltage having a 90 degree time phase over a driving piezoelectric element comprised of two groups (A, B) disposed with 90 degrees positional phase therebetween. 8 is the rail-like stator affixed to base plate 10 of the motor case and making a friction contact with resilient member 1 under effect of a spring 3 by way of a vibration absorber 5, a piece of felt for example.

6A is a comb-teeth type stopper. The comb-teeth 6Aa are inserted into the slits (not indicated in the figure) of the opposite side of resilient member 1 which does not contact with the rail-like stator 8, and support the resilient member 1 by way of felt 7 placed on a bottom of said slit by said comb teeth 6Aa.

The resilient member 1 is supported by a table plate 4 by ways of stopper 6A, pressurized spring 3 etc. The table plate 4 is supported by a restraint member 9 which restrains movement other than the predetermined direction $B_Y$.

When a traveling vibration wave is formed on the resilient member 1, a friction produced between the rail-like stator 8 and the resilient member 1 causes the resilient member to move on the rail-like stator 8 and subsequently the table plate 4 and other elements such as 3, 5, 6A, 7 also move in the direction $B_Y$ along the restraint member 9. Simultaneously, the generated friction drive force will effect a part of the resilient member and the part is deviated from the supporting position, a momentum force is created on the resilient member which causes the resilient member to slide away in the directions of $B_X$ and $B_Y$.

The comb-teeth 6Aa of stopper 6A are inserted into the slits of resilient member 1 as shown in FIG. 12 thereby restraining the resilient member's movement towards $B_Y$ direction and at the same time supporting its weight by way of the felt 7. The restraint members 6B and 6C restrain the deviation of the resilient member in the direction $B_X$ and the restraint member 6D restrains the pressurized side of resilient member 1 in the direction $B_Y$. Thus supported by these elements 6A through 6D, the resilient member 1 can make a smooth and straight movement without wobbling along with the table plate 4.

As disclosed in U.S. Pat. Nos. 4,723,129 and 4,740,796, this type of motor is used as an actuator of a printer head for bubble jet type in which the printer head is installed on a carriage (not indicated in figure) of the top plate 4, thereby enabling the head to make a straight forward and backward motions.

However, the foregoing example entailed a shortcoming in which the resilient member 1 becomes unstable and tilted towards the direction A in FIG. 11. It is because the thickness of felt 7 supporting said resilient member changes with a lapse of time.

This shortcoming of the vibration wave apparatus also resulted in a low quality of printing.

SUMMARY OF THE INVENTION

One aspect of this invention is to dissolve the above shortcoming and to provide an improved vibration wave driven motor including the means for supporting a resilient member without hindering the vibration formed therewith.

Another aspect of this invention is to provide a printer with a vibration wave driven motor for a better quality of printing.

One aspect of this invention concerns a vibration wave driven apparatus wherein a traveling wave generated on the resilient member will move and transport said resilient member on a rail-like stator, characterized in that means for supporting said resilient member is positioned on or about the center of an adjacent antinode and node of each of the standing wave.

Other aspects of this invention will become apparent according to the detailed description set forth hereinbelow.

DESCRIPTION OF THE PREFERRED EMBODIMENTS

Figure 1:
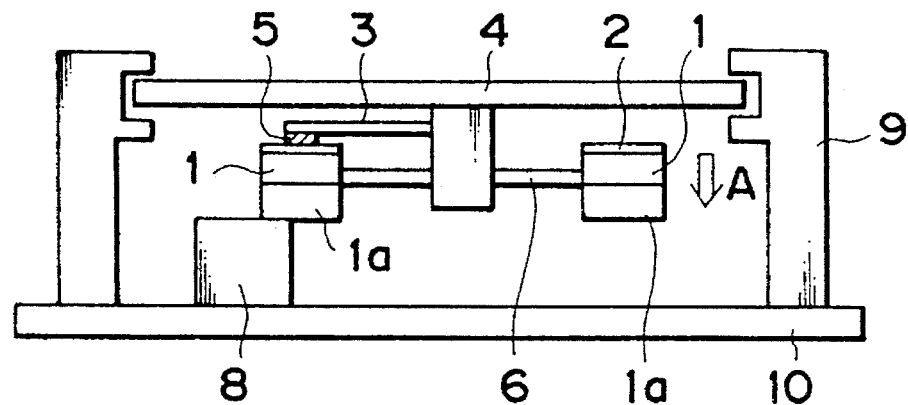
FIG. 1 is an essential side view of the vibration wave driven apparatus according to the embodiment 1 of this invention.

Hereinafter this invention will be described in detail according to examples shown in the drawings attached, in which it should be noted that the explanation related to the prior arts is eliminated by giving the same symbols to the components identical as in the prior art.

Embodiment 1

Figure 2A:
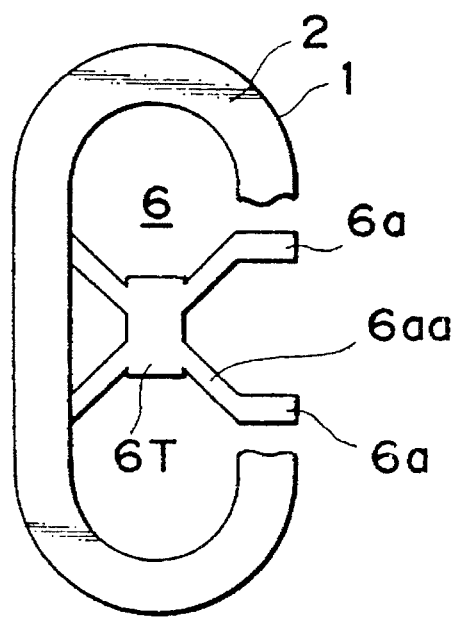
FIG. 2A is a plane view of main components of FIG. 1.
Figure 2B:
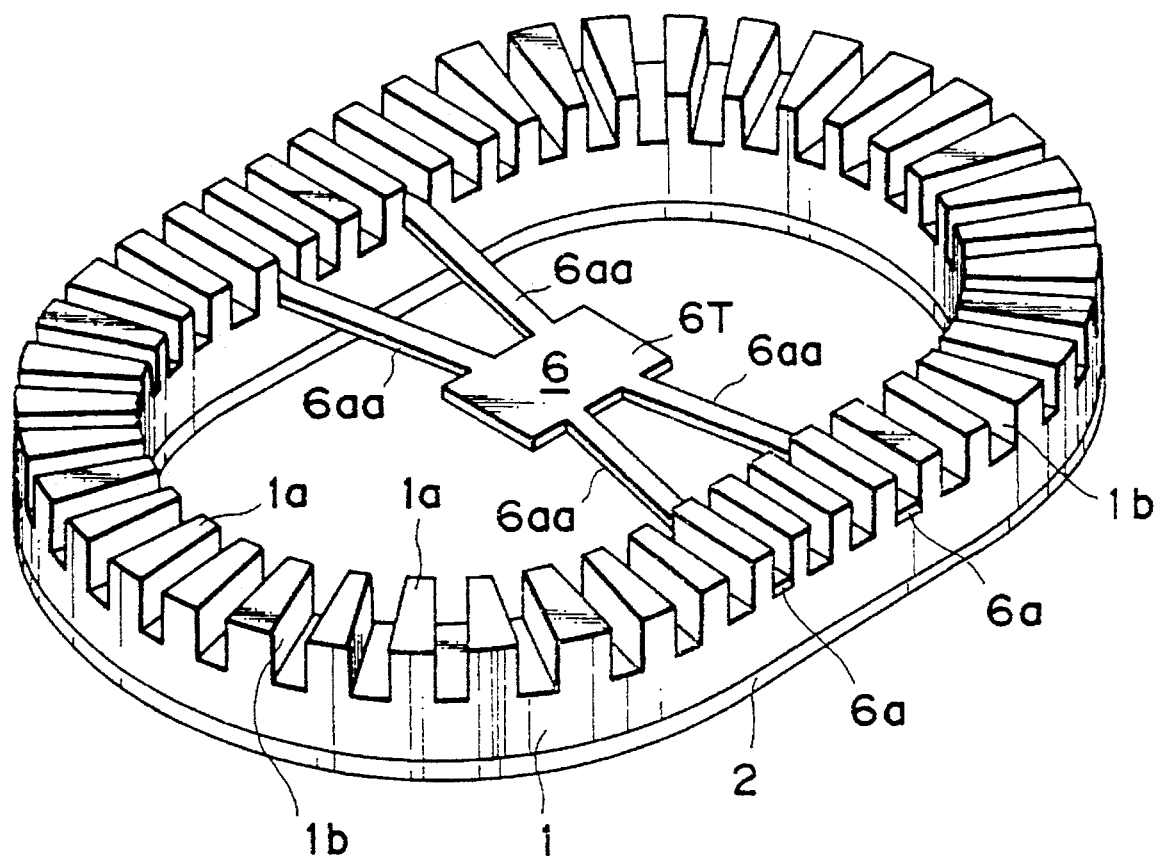
FIG. 2B is a diagonal view of the essential parts of apparat in FIG. 1.

FIG. 1 shows a side view of the essential components of the embodiment 1 of this invention and FIGS. 2A and 2B each shows a plane and a diagonal view respectively thereof. In this embodiment, X-shaped supplementary plate 6 having the projections 6a is cemented or welded to the bottom part of the slits 1b formed on the resilient member 1 (see FIG. 2A and 2B), and the center element 6T is firmly affixed to the table plate 4.

Figure 3:
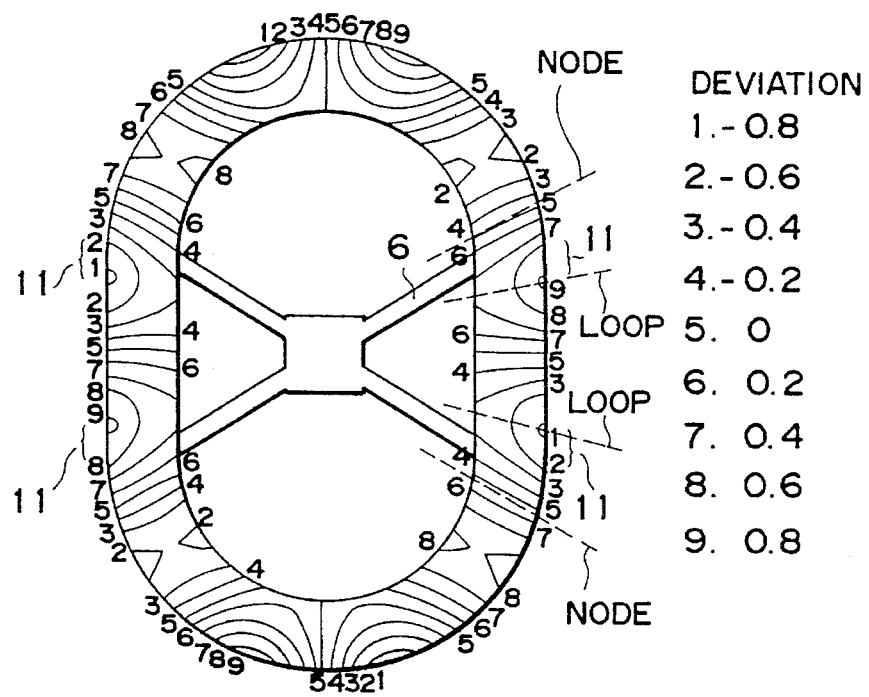
FIGS. 3 and 4 show the contour lines of a standing wave mod based on the finite element method.
Figure 4:
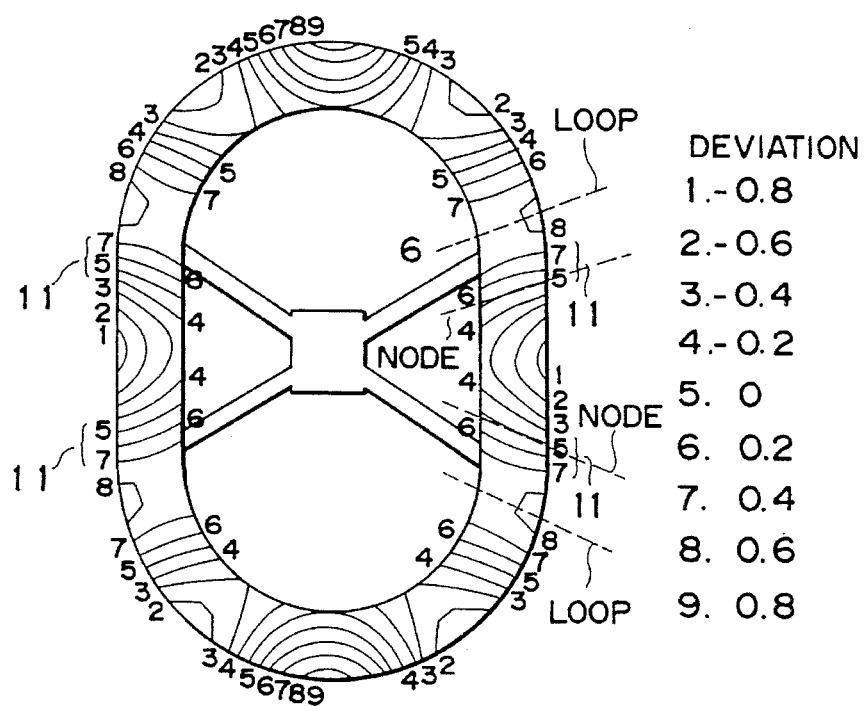
Figure 5:
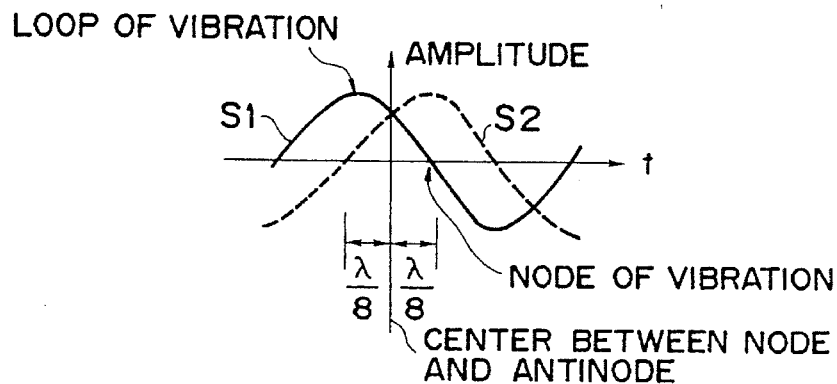
FIG. 5 is an wave mode of two standing wave sectors.
Figure 6:
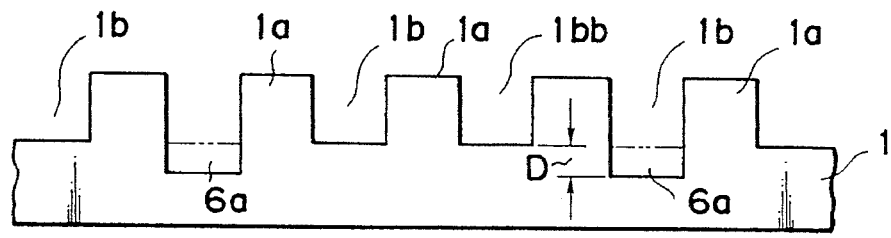
FIG. 6 shows slits on the resilient member preferable when a supplementary support plate is coupled with a bottom portion of the slits.

FIGS. 3 and 4 show the contour line of standing wave deviations formed on resilient member 1 by two groups of the piezoelectric element 2 on the basis of the specific value analysis of the finite element method. These figures show the wave deviation composition formed in the perpendicular direction against the surface of the piezoelectric element 2. The maximum deviation is normalized as "1". As shown in FIGS. 3 and 4, the projections 6a of supplementary plate 6 are set in the center or nearby (11 in Figure) between the antinode and node of two standing waves. The amplitudes of two standing waves in A and B groups of the piezoelectric element 2 are the same at the center between antinode and node as shown in FIG. 5. Therefore when four projections 6a of the supplementary plate 6 are connected at the center portion or nearby, resonant frequencies of two standing waves don't shift ralative to each other and a pure traveling vibration wave can be obtained because an equal influence is effected to both standing waves.

However, when supplementary plate 6 is connected to the bottom of the slits 1b of resilient member 1, this connection tends to make uneven the thickness of the resilient member and disorder the traveling wave, thereby reducing the efficiency of the motor. In order to overcome this, it is preferable to deepen the depth of slits 1bb as much as the depth equal to the thickness D of the projections 6a of supplementary plate 6, wherein the projections 6a (in FIG. 2A) are inserted into the slits 1bb in order to eliminate the uneven thickness.

Embodiment 2

Figure 7:
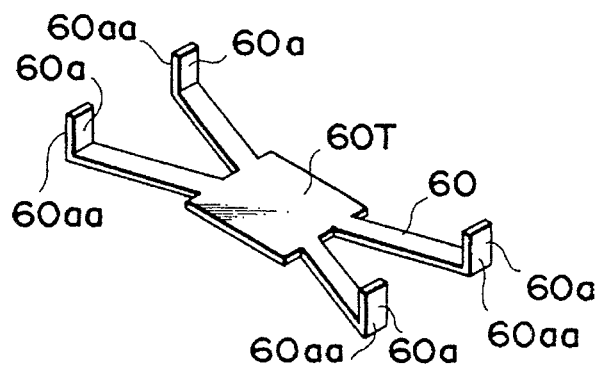
FIG. 7 is a side view and FIG. 8 is a diagonal view of the embodiment 2 of this invention.
Figure 8:
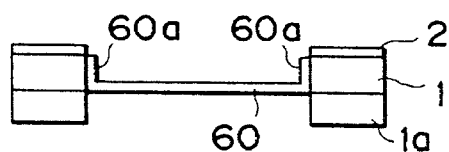

FIG. 7 is the second embodiment of this invention in which only a supplementary plate 60 is depicted. Although this embodiment shows an X-shaped supplementary plate similar to the first embodiment, the tips 60aa of projections 60a are inwardly bent and connected to the bottom inside of the resilient member 1 by cementing or welding as shown in FIG. 8. Likewise in this embodiment, the projections 60a are connected or fixed substantially at the center between an adjacent antinode and node of the standing wave generated in the A group and substantially at the center between an adjacent antinode and node of the standing wave generated in the B group.

Embodiment 3

Figure 9:
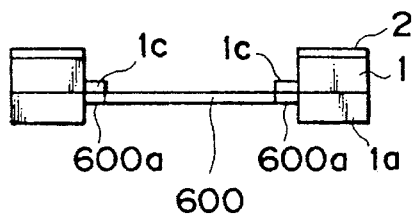
FIGS. 9 and 10 are a side view and a plane view respectively of the embodiment 3 of this invention.
Figure 10:
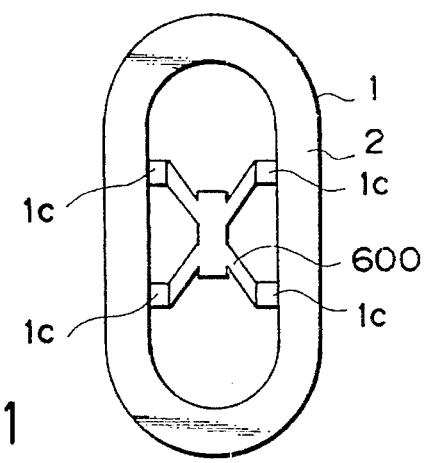
Figure 11:
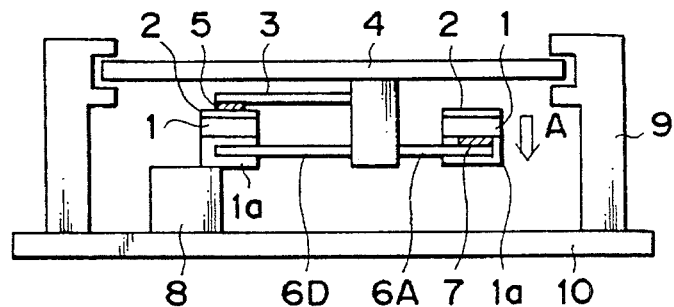
FIGS. 11 and 12 each shows a side view and a plane view of the composition of a prior art vibration wave driven motor.
Figure 12:
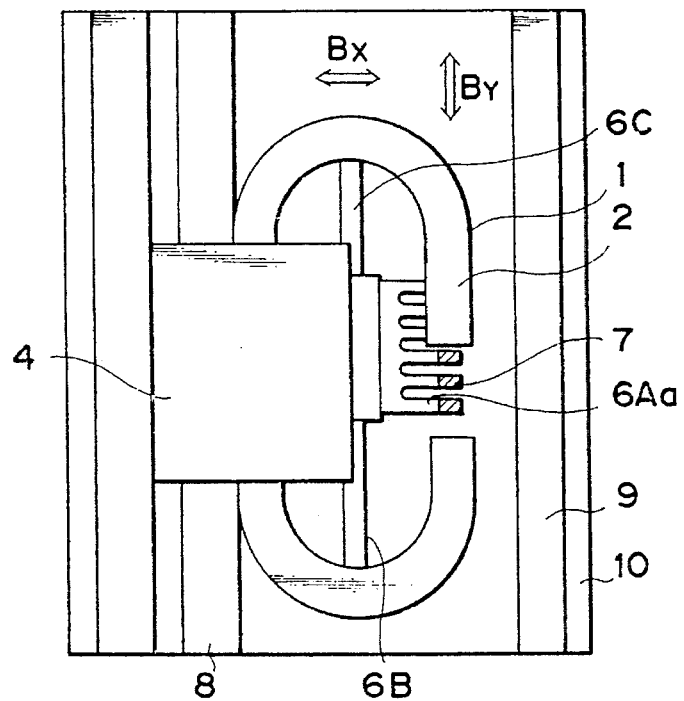

FIGS. 9 and 10 show the third embodiment of this invention wherein the projections 600a formed on the tips of supplementary plate 600 are cemented or welded to the projections 1c which are provided at the inside surface at substantially the center of the resilient member 1. It should be noted that the projections 1c of the resilient member 1 are positioned at or nearby the neutral plane of said resilient member where no stretch or shrinkage occurs when vibration is generated on the resilient member so as not to hinder the vibration.

Figure 13:
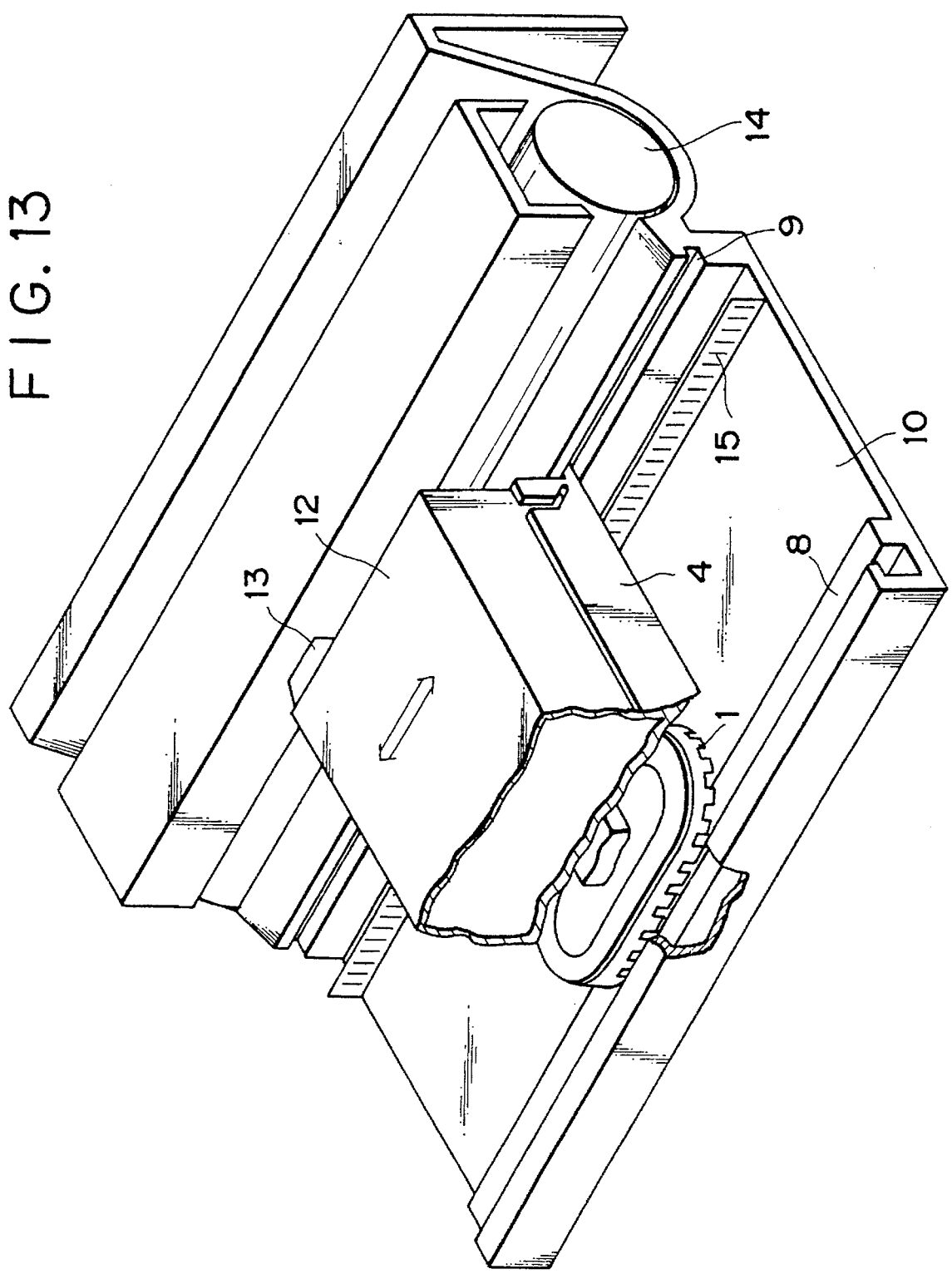
FIG. 13 is a diagonal view of one embodiment of a printer employing the vibration wave driven motor.

FIG. 13 is a diagonal view of the bubble jet type printing apparatus which employs a vibration wave driven motor. An ink tank 12 is installed above the top plate 4 and ink is discharged from the printing head 13 to print on paper rolled out from the platen roller 14. 15 is an encoder slit plate to control the speed of the carriage.

As described above, in the present invention, the support members are connected at substantially the center between the adjacent node and antinode of the respective two standing waves with $\lambda/4$ phase shift ($\lambda$: wave length) generated in the resilient member so that the resilient member can be firmly supported with no deviation of the resonant frequencies of the two standing waves.

Employment of above described vibration wave driven apparatus as a drive unit for impression head etc. can thus achieve a high precision impression for printing.

While embodiments of the supplementary support plate described in the foregoing examples is X-shaped, application of this invention may be extended to include and not limited to such configuration and an H-shaped or other configurations may be adopted. Also application of the above described vibration wave driven apparatus shall not be confined only to the above type printer and it may be extended to include many other apparatus and equipments of various types.

In addition to the above examples, this invention is further applicable in an apparatus in which the resilient member may be installed immovable and the other elements contacted therewith can be made movable.

What is claimed is:

1. A vibration wave driven motor comprising:

a vibration member having a contact surface;

an electro-mechanical energy conversion member, which is in contact with said vibration member, for generating a traveling wave in said vibration member in response to electrical signals applied thereto, wherein the traveling wave creates relative movement between said vibration member and a contact member in contact with said contact surface of said vibration member, said conversion member having a first element for generating a first standing wave in the vibration member in response to a first electrical signal and a second element for generating a second standing wave in the vibration member in response to a second electrical signal; and a member for supporting said vibration member at a predetermined position, said supporting member having a first engaging portion which engages said vibration member substantially at the center of an adjacent antinode and node of said first standing wave and a second engaging portion which engages said vibration member substantially at the center of an adjacent antinode and node of said second standing wave.

2. A vibration wave driven motor according to claim 1, wherein said vibration member has a loop-shaped elastic element.

3. A vibration wave driven motor according to claim 2, wherein said elastic element has a plurality of slits in the contact surface side.

4. A vibration wave driven motor according to claim 3, wherein each of said first and second engaging portions is engaged at the bottom of a respective selected one of said slits.

5. A vibration wave driven motor according to claim 1, wherein said supporting member is X-shaped.

6. A vibration wave driven motor according to claim 1, wherein said supporting member is H-shaped.

7. A vibration wave driven motor according to claim 4, wherein the depth of said slits to which said engaging portions are engaged is deeper than that of the slits to which said engaging portions are not engaged.

8. A vibration wave driven motor according to claim 2, wherein each of said first and second engaging portions are affixed to an inside surface of said elastic element.

9. A vibration wave driven motor according to claim 2, wherein said vibration member has a plurality of connecting portions provided at an inner side surface thereof, and wherein each of said engaging portions is connected thereto.

10. A vibration wave driven motor comprising:

a movable, loop-shaped vibration member having a contact surface;

a contact member arranged in contact with the contact surface of said vibration member;

an electro-mechanical energy conversion member, which is in contact with said vibration member, for generating a traveling wave in said vibration member in response to electrical signals applied thereto, wherein the traveling wave creates relative movement between said vibration member and said contact member, said conversion member having a first element for generating a first standing wave in the vibration member in response to a first electrical signal and a second element for generating a second standing wave in the vibration member in response to a second electrical signal;

a member for supporting said vibration member at a predetermined position, said supporting member having a first engaging portion which engages the vibration member substantially at the center of an adjacent antinode and node of said first standing wave and a second engaging portion which engages the vibration member substantially at the center of an adjacent antinode and node of said second standing wave; and a member for guiding the movement of said vibration member.

11. A vibration wave driven motor according to claim 10, wherein said vibration member has a metal loop-shaped elastic element.

12. A vibration wave driven motor according to claim 11, wherein said elastic element has a plurality of slits in said contact surface side.

13. A vibration wave driven motor according to claim 12, wherein each of said first and second engaging portions is engaged at the bottom of a respective selected one of said slits.

14. A vibration wave driven motor according to claim 10, wherein said supporting member is X-shaped.

15. A vibration wave driven motor according to claim 10, wherein said supporting member is H-shaped.

16. A vibration wave driven printer comprising:

a vibration member having a contact surface;

a printing head mounted on said vibration member;

an electro-mechanical energy conversion member, which is in contact with said vibration member, for generating a traveling wave in said vibration member in response to electrical signals applied thereto, wherein the traveling wave creates relative movement between said vibration member and a contact member being in contact with said contact surface of said vibration member, said conversion member having a first element for generating a first standing wave in the vibration member in response to a first electrical signal and a second element for generating a second standing wave in the vibration member in response to a second electrical signal; and a member for supporting said vibration member at a predetermined position, said supporting member having a first engaging portion which engages the vibration member substantially at the center of adjacent antinode and node of said first standing wave and a second engaging portion which engages the vibration member substantially at the center of an adjacent antinode and node of said second standing wave.

17. A vibration wave driven motor according to claim 16, wherein said vibration member has a loop-shaped elastic element.

18. A vibration wave driven motor according to claim 17, wherein said elastic element has a plurality of slits at said contact surface side.

19. A vibration wave driven motor according to claim 18, wherein each said first and second engaging portions is engaged at the bottom of a respective selected one of said slits.

20. A vibration wave driven motor according to claim 16, wherein said supporting member is X-shaped.

21. A vibration wave driven motor according to claim 16, wherein said supporting member is H-shaped.

22. A vibration wave driven apparatus comprising:

a vibration member having a contact surface;

an output member which is moved in a predetermined direction by said vibration member;

an electro-mechanical energy conversion member, which is in contact with said vibration member, for generating a traveling wave in said vibration member in response to electrical signals applied thereto, wherein the traveling wave creates relative movement between said vibration member and a contact member in contact with said contact surface of said vibration member, said conversion member having a first element for generating a first standing wave in the vibration member in response to a first electrical signal and a second element for generating a second standing wave in the vibration member in response to a second electrical signal; and a member for supporting said vibration member at a predetermined position, said supporting member having a first engaging portion which engages the vibration member substantially at the center of an adjacent antinode and node of said first standing wave and a second engaging portion which engages the vibration member substantially at the center of an adjacent antinode and node of said second standing wave.

23. A vibration wave driven motor according to claim 22, wherein said vibration member has a loop-shaped elastic element.

24. A vibration wave driven motor according to claim 23, wherein said elastic element has a plurality of slits at said contact surface.

25. A vibration wave driven motor according to claim 24, wherein each of said first and second engaging portions is engaged at the bottom of a respective selected one of said slits.

26. A vibration wave driven motor according to claim 22, wherein said supporting member is X-shaped.

27. A vibration wave driven motor according to claim 22, wherein said supporting member is H-shaped.

28. A vibration wave driven actuator comprising:

a vibration member having an electro-mechanical energy conversion member, said conversion member having a first element for generating a first standing wave in the vibration member in response to a first electrical signal and a second element for generating a second standing wave in the vibration member in response to a second electrical signal; and a member for supporting said vibration member only at a position where a magnitude of said first standing wave coincides or substantially coincides with a magnitude of said second standing wave.

29. A vibration wave driven actuator according to claim 28, wherein a position of said first element is spaced apart from a position of said second element.

30. A vibration driven printer comprising:

a vibration member having an electro-mechanical energy conversion member, said conversion member having a first element for generating a first standing wave in the vibration member in response to a first electrical signal and a second element for generating a second standing wave in the vibration member in response to a second electrical signal;

a printing head functionally engaged with said vibration member; and a member for supporting said vibration member only at a position where a magnitude of said first standing wave coincides or substantially coincides with a magnitude of said second standing wave.

31. A vibration driven printer according to claim 30, wherein a position of said first element is spaced apart from said second element.

32. A vibration wave driven system comprising:

a vibration member having an electro-mechanical energy conversion member, and a contact surface, said conversion member having a first element for generating a first standing wave in the vibration member in response to a first electrical signal and a second element for generating a second standing wave in the vibration member in response to a second electrical signal;

a member for supporting said vibration member only at a position where a magnitude of said first standing wave coincides or substantially coincides with a magnitude of said second standing wave;

a contact member which is in contact with the contact surface of said vibration member, a combined vibration wave of the first standing wave and the second standing wave generated in said vibration member causing relative movement between said vibration member and said contact member; and an output member operationally engaged with one of said contact member and said vibration member and driven by said one member in a predetermined direction.

* * * * *

UNITED STATES PATENT AND TRADEMARK OFFICE
CERTIFICATE OF CORRECTION

PATENT NO. : 5,455,478
DATED : October 3, 1995
INVENTOR(S) : ATSUSHI KIMURA, ET AL.

It is certified that error appears in the above-indentified patent and that said Letters Patent is hereby corrected as shown below:

TITLE PAGE

At [56] References Cited

"Mukohjima et al." should read --Mukoujima et al.--.

"Takagi" should read --Takagi et al.--.

At [56] Foreign Patent Documents

"0135369  6/1986  Japan" should read --61-135369  6/1986 Japan--; and

"0190570  8/1988  Japan" should read --63-190570  8/1988 Japan--.

Column 1

Line 53, "effect" should read --affect--.

Column 2

Line 7, "a" should be deleted.

Line 45 "mod" should read --mode--.

Line 46, "an" should read --a--.

UNITED STATES PATENT AND TRADEMARK OFFICE
CERTIFICATE OF CORRECTION

PATENT NO. : 5,455,478

DATED : October 3, 1995

INVENTOR(S) : ATSUSHI KIMURA, ET AL.

It is certified that error appears in the above-indentified patent and that said Letters Patent is hereby corrected as shown below:

<u>Column 4</u>

Line 21, "Also" should read --Also,--.

<u>Column 5</u>

Line 5, "are" should read --is--.

Line 60, "being" should be deleted.

<u>Column 6</u>

Line 4 "of" should read --of an--.

Signed and Sealed this

Fourteenth Day of May, 1996

Attest:

BRUCE LEHMAN

*Attesting Officer*  *Commissioner of Patents and Trademarks*